Oct. 20, 1931. J. SCHEIDEMAN 1,828,076
DEMOUNTABLE TIRE RIM
Filed May 29, 1930  2 Sheets-Sheet 2
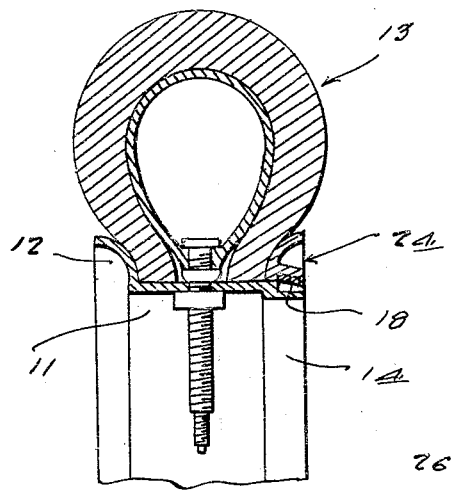
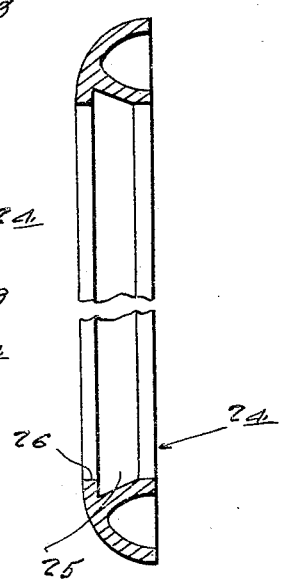
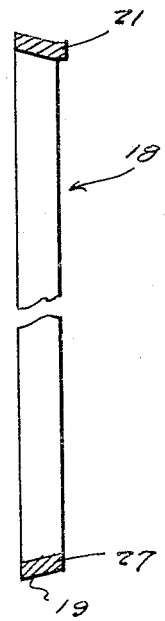
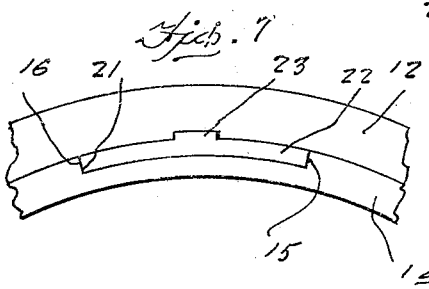
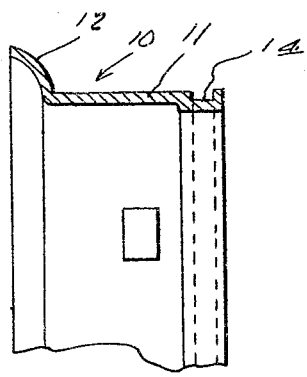
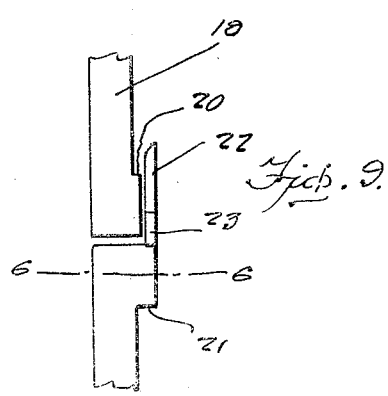
Inventor
John Scheideman
By [signature]
Attorney Patented Oct. 20, 1931

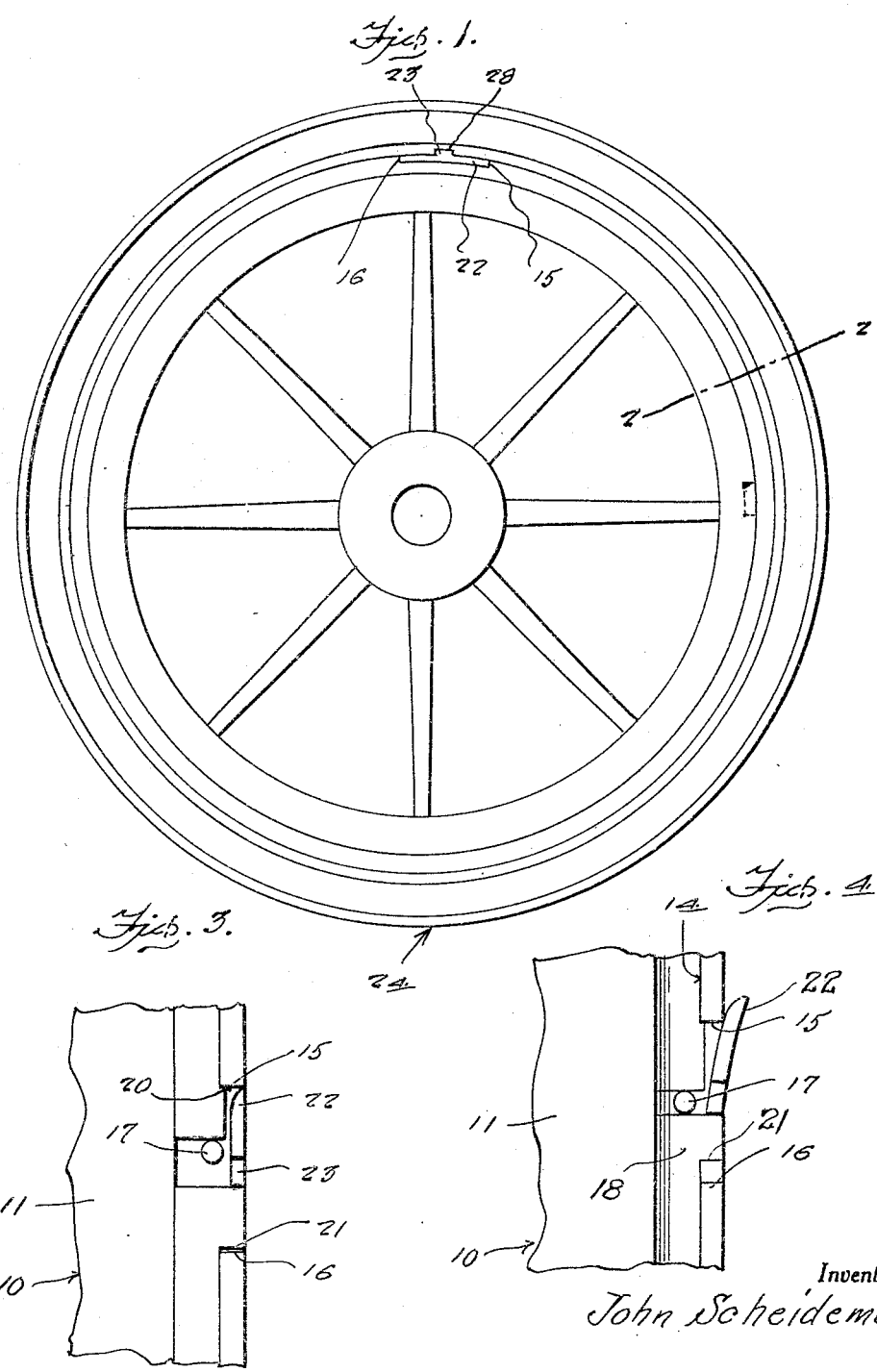

1,828,076

UNITED STATES PATENT OFFICE

JOHN SCHEIDEMAN, OF CINCINNATI, OHIO

DEMOUNTABLE TIRE RIM

Application filed May 29, 1930. Serial No. 457,212.

This invention relates to an improved rim construction for a demountable tire of the pneumatic type.

The particular structural feature of distinction embodied in the improved rim structure is comprehended in a novel removable retaining flange, and equally novel means for maintaining said flange in tire retaining position for permitting it to be readily removed to expedite exchange of tires.

Briefly stated, the felly portion of the rim is provided along one edge with a stationary flange and the opposite edge portion is constructed to accommodate the removable retaining flange, and the flange and means for holding it in place being expressly designed to enable the invention to better fulfill the requirements of a structure of this particular class.

In the drawings:

Figure 1 is a side elevational view of a wheel having a tire flange, constructed in accordance with the present invention, mounted thereon.

Figure 2 is a cross sectional view taken approximately on the plane of the line 2—2 of Figure 1.

Figure 3 is a fragmentary plan view showing the retaining means for the flange holding band.

Figure 4 is a view like Figure 3 with the band removed.

Figure 5 is a sectional view through the especially designed retaining flange.

Figure 6 is a similar sectional view through the band, the section being approximately on the plane of the line 6—6 of Figure 9.

Figure 7 is an edge view of the grooved edge of the rim showing the band retaining means in place.

Figure 8 is a sectional view through the rim with the holding band removed.

Figure 9 is a top plan view of the adjacent ends of the split holding band showing the end construction.

Referring now to the drawings by numeral indicating characters, it will be observed that the numeral 10 in Figure 8 represents generally the major part or body of the complete rim structure. This includes an endless annulus or rim face 11 having a suitably curved fixed side flange 12 around one edge constituting an abutment for the demountable pneumatic tire 13 as shown in Figure 2.

The width of the rim is such as to permit the inner periphery of the tire casing to be completed seated thereon. That portion of the rim extending beyond the tire is inwardly offset and formed with a retaining channel 14. The channel is endless except at the point shown in Figures 3 and 4 where it will be observed that the notch is cut out to define a pair of spaced shoulders 15 and 16 respectively.

Also at this point there is a stop pin or stud 17. This retaining channel is adapted to receive and hold in place the split locking ring generally represented by the numeral 18 in Figure 6. This split ring is of general frusto-conical configuration to provide the desired bevel for the inner edge 19.

As seen in Figure 9 the end portions of the ring are widened somewhat to form heads, thus defining a shoulder as at 20 on one side of the split and a similar headed shoulder 21 on the opposite side. The latter part is provided with an extension tongue or finger 22 which constitutes a means for releasing the band through the medium of a screw driver or similar instrument. Incidently the numeral 23 merely designates a projection which seats in a notch formed in an adjacent portion of the removable side flange 24, as shown for example in Figure 1.

This removable side flange 24 is of endless form and is provided with an internal channel 25 opposed to the channel 14 and a complemental rib or bead 26. The edge 19 of the split ring 18 is adapted to engage the rib 26 and the opposite 27 engages the outer wall of the channel 14 as shown in the assembly view in Figure 2.

In practice, it is understood, that the complete tire in semi-deflated form is slipped over the rim base 11 and against the fixed side flange 12 before the split locking ring 18 or the removable side flange 24 is placed in position. Next, the split locking ring 18 is arranged in the retaining channels 14 in such a position that the free end of the tongue 22 overlaps the outer edge of the rim adjacent the shoulder 15 so that the split ring 18 will be contracted in the channel 14 and there will be a space between the shoulders 16 and 21.

Then the retaining flange 24 is slipped over the rim and the contracted split ring and it will of course be understood that while this is being done, the notch 28 in the flange 24 must be positioned so that it will pass over the projection 23 on the tongue. The retaining flange 24 has rotary movement on the rim, and while being pressed into place, it will impart a slight rotary movement to the split ring so that the ring is moved enough to cause the free end of the tongue 22 to snap into place in engagement with the shoulder 15 and thus the split ring will expand into the channel 25 and thus lock the retaining flange 24 in position.

Thus the one edge 19 engages the shoulder 26 and the opposite edge 27 engages the outer wall of the retaining channel 14 as shown in Figure 2 to hold the flange 24 in place and to thereby maintain the tire on the rim. To remove a tire, the tire is first deflated and then the retaining flange 24 is pressed inwardly toward the tire to clear the retaining tongue 22. A screw driver or the like is then pressed between the retaining tongue and that head or end of the split ring which carries the shoulder 20 so as to force the tongue outwardly to cause the free end of the tongue to overlap that part of the rim which carries the shoulder 15 so that the split ring will again contract into the channel 14. Then the retaining flange 24 can be pulled off the rim. The split ring is then removed and the tire taken off the rim.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. A rim for pneumatic tires comprising a rim base having a fixed side flange at one peripheral edge and an annular channel on its peripheral face adjacent to the other edge, said rim base also having a notch opening out to the last mentioned edge and communicating with the channel, a stop pin in the channel intermediate the ends of the notch, a removable tire flange having a channel on its radially inner face, and a split locking ring for fitting in the channels to hold the removable flange in place on the rim base, the ends of the split ring lying on opposite sides of the stop pin and one of said ends being spaced from said stop pin, anchoring shoulders formed on the ends of the split ring for engaging the end walls of the notches and a flexible tongue connected to one end of the split ring and fitting in the notch when the ring is expanded and adapted to be forced from the notch to permit contraction of the split ring.

2. A rim for tires comprising a rim base having a fixed side flange at one peripheral edge thereof and an annular channel adjacent its other edge, said rim base also having a notch in the outer wall of the channel, a removable tire flange having a channel on its radially inner face and a split locking ring for fitting in the channels for holding the removable flange in place on the rim base, and a flexible tongue on one end of the split ring fitting in the notch when the split ring is expanded and adapted to be forced from the notch to permit the split ring to contract, whereby the removable flange can be pulled from the rim base.

In testimony whereof I affix my signature.

JOHN SCHEIDEMAN.